United States Patent [19]

Holub

[11] 4,353,288

[45] Oct. 12, 1982

[54] ROTARY SLIDE STEERING VALVE FOR AUXILIARY POWER STEERINGS

[75] Inventor: Heinrich Holub, Schwabisch Gmund, Fed. Rep. of Germany

[73] Assignee: Zahnradfabrik Friedrichshafen, AG, Friedrichshafen, Fed. Rep. of Germany

[21] Appl. No.: 102,327

[22] Filed: Dec. 11, 1979

[30] Foreign Application Priority Data

Dec. 29, 1978 [DE] Fed. Rep. of Germany ....... 2856606

[51] Int. Cl.³ .............................................. F15B 9/10
[52] U.S. Cl. ................................... 91/375 A; 91/444; 91/467; 137/625.24
[58] Field of Search ..................... 91/375 A, 444, 467; 137/625.24; 180/132

[56] References Cited

U.S. PATENT DOCUMENTS

| Re. 25,126 | 2/1962 | Charlson | 91/467 |
| 4,063,490 | 12/1977 | Duffy | 91/375 A X |
| 4,194,531 | 3/1980 | Bishop | 91/375 A X |

*Primary Examiner*—Gerald A. Michalsky
*Attorney, Agent, or Firm*—Zalkind & Shuster

[57] ABSTRACT

A rotary plug steering valve of the worm gear type for auxiliary power steering of motor vehicles is provided with a rotary plug valve and a coacting valve sleeve including means for flow passage of return hydraulic fluid to a servomotor via an inner ported sleeve disposed within the valve plug, which sleeve also serves as an alignment and bearing member for the valve plug. The advantage achieved by thus providing additional serial flow control edges between the rotary plug and a return connection via the inner sleeve is the reduction of hissing flow noises in steering operations, by a throttling of return oil flow during the relative rotation of the valve plug and the inner sleeve. This reduces the cross section of return oil flow passage, but causes no throttling in neutral position of the valve for straight ahead steering when respective passages of the valve plug and inner sleeve are in full register.

8 Claims, 3 Drawing Figures

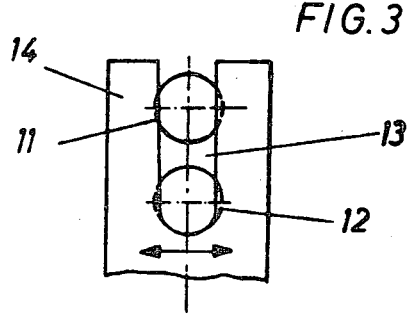
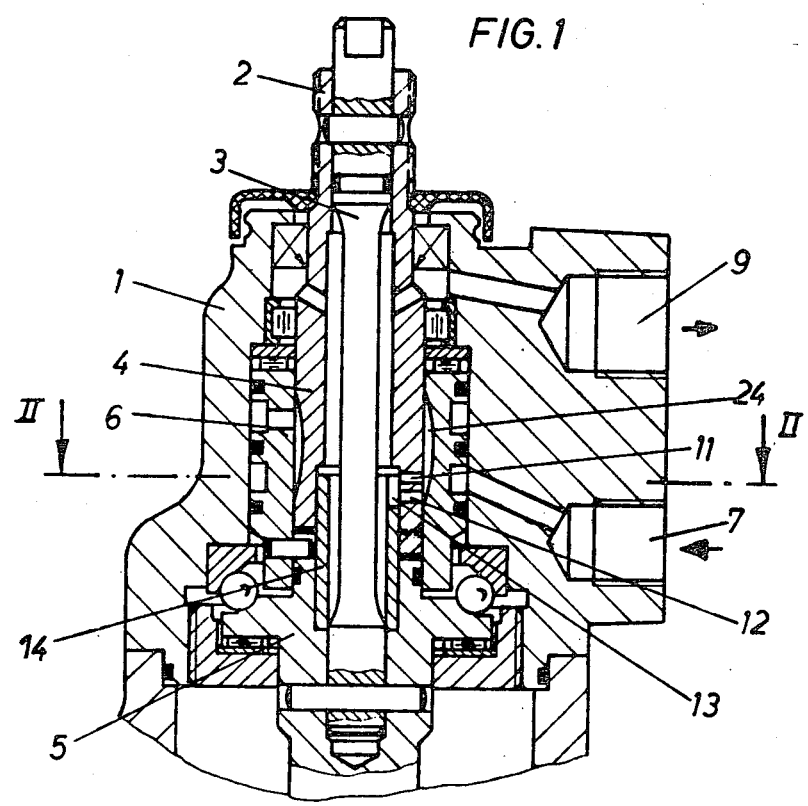

ROTARY SLIDE STEERING VALVE FOR AUXILIARY POWER STEERINGS

Cross reference is made to the following pending applications assigned to the assignee of this application:
Walter, W., Ser. No. 068,363, filed Aug. 21, 1979
Elser, D., Ser. No. 079,204, filed Sept. 26, 1979, now U.S. Pat. No. 4,285,266.
Schuetze et al, Ser. No. 950,553, filed Oct. 12, 1978

The last identified application (Schuetze et al) is incorporated herein by reference.

In conventional rotary steering valves, the control of hydraulic fluid was accomplished hitherto exclusively by flow control edges between rotary plug valve and coacting sleeve, whereby the desired directional control of flow is achieved by rotation of the rotary valve plug relative a normally stationary valve sleeve. Sometimes, however, it is advantageous for various reasons, to augment the necessary flow control edges through two valving control edges, serially. Therefore the present invention discloses a construction which effects such serial flow and this is accomplished by a ported sleeve within the rotary valve plug wherein the ports effect additional flow control edges for the control of hydraulic fluid from a servomotor to a return connection leading to a sump. The effect is to throttle return flow for reasons hereinafter discussed.

Since in this invention the rotary valve plug rotates relative to the inner sleeve, the lapping and overlapping of the ports of the inner sleeve with ports of the valve plug effect serial flow control to afford a throttling of return flow.

A problem with conventional rotary plug steering valves is solved by the invention. Thus, conventional rotary plug valves, at a certain level of pressure cause noises due to flow, in the form of unpleasant hissing. This noise is caused by flow past control edges and is in direct dependence on the pressure ratio of the upstream and downstream pressures of flow through control edges. The greater the pressure gradient the more unpleasant will be the hissing noises.

It is known that change in the pressure ratios can be effected by throttling of flow at control edges through which passes return flow from a servomotor. All, or at least a considerably reduction, of the noises due to such flow can be achieved by a throttling of the return flow. However, there are disadvantages in the throttling of the return flow during a return to neutral position of a steering valve, or in neutral position. Thus, there occurs a sluggishness of the return movement of the vehicle steering mechanism. Additionally, by unnecessary heating of the hydraulic fluid, a waste of power results.

As a result of the arrangement of the invention of additional control edges, the difficulty of creating a rotary plug steering valve for auxiliary power steering systems of motor vehicles of the initially mentioned type are solved, wherein a return-dynamic pressure is effected in the course of steering, while in neutral or return to neutral the disadvantages are avoided.

Briefly, in arrangement, the invention provides for a rotary plug having bores for return flow control, which flow must serially pass through slots of a sleeve inside the rotary plug for flow into the inner sleeve and thence to a return connection. Inner sleeves have heretofore been used as bearing bushings for rotary plugs and for alignment of the plugs. The present invention uses a longer bearing bushing so as to provide for throttling passages therein. The valve plug bores and the inner sleeve slots are disposed in relation to each other to overlap in the neutral position so that an unthrottled stream of hydraulic fluid passes, while in a steering operation throttling of the hydraulic fluid via the bores and the slots takes place due to decreasing overlap with increasing relative rotation between valve plug an inner sleeve.

Thus, when the valve plug bores are aligned with the inner sleeve slots there is a sufficiently large cross section of passage so that, in neutral position, no return dynamic pressure is built-up. Essentially, the return pressure prevails in the system throughout and proper steering mechanism return results in returning to neutral position. Furthermore, no loss of power occurs in neutral position. Pump flow is shunted conventionally to sump.

Accordingly, during steering and relative rotation of the valve plug in relation to the normally staionary inner sleeve and the valve sleeve surrounding the valve plug, the changing overlap of valve plug and inner sleeve passages controls return dynamic pressure generally in proportion to the pressure increase in the system, increasing the throttling effect with pressure increase dependent on the path of return flow through the valve.

A special advantage of the invention resides in a controlled return dynamic pressure during steering achieved with very simple means. As stated, the return path of the hydraulic fluid is not changed, it is generally radial with no special bends or turns. It is only necessary to axially extend a known bearing, bushing or sleeve within a rotary valve plug to effect a path to a return connection via slots provided in the extended portion of the bearing sleeve.

Thus, besides the customary control leading edges of a rotary valve in one peripheral plane, additional control edges for the return flow control are disposed in a second and interior peripheral plane.

The apertures in the inner sleeve may be formed in many ways. Thus, for example, radial bores, or longitudinal grooves open toward the return connection, etc. It is assumed merely that they are large enough, so that an unthrottled return flow is possible in the neutral position.

A simple solution is offered for passages in the inner sleeve in the use of longitudinal slits or slots which are open at the top edge of the inner sleeve.

This is an advantage, a simplicity of passage of flow from two axially aligned bores of the valve plug through meeting slots.

Due to the smaller diameter of the inner sleeve the width of slots may not be made chosen too large. A sufficiently large return cross section for an unthrottled return in neutral position can be effected by multi-path flow return hydraulic fluid through two longitudinally aligned bores in the valve plug aligning with a longitudinal slot in the inner sleeve, all in plurality.

A detailed description of the invention now follows in conjunction with the appended drawing in which:

FIG. 1 shows a longitudinal section through the rotary plug steering valve;

FIG. 3 shows an enlarged fragmentary detail of the relationship between the inner sleeve slot and valve plug bores viewed in the direction of the arrow A, FIG. 1.

Figure 2:
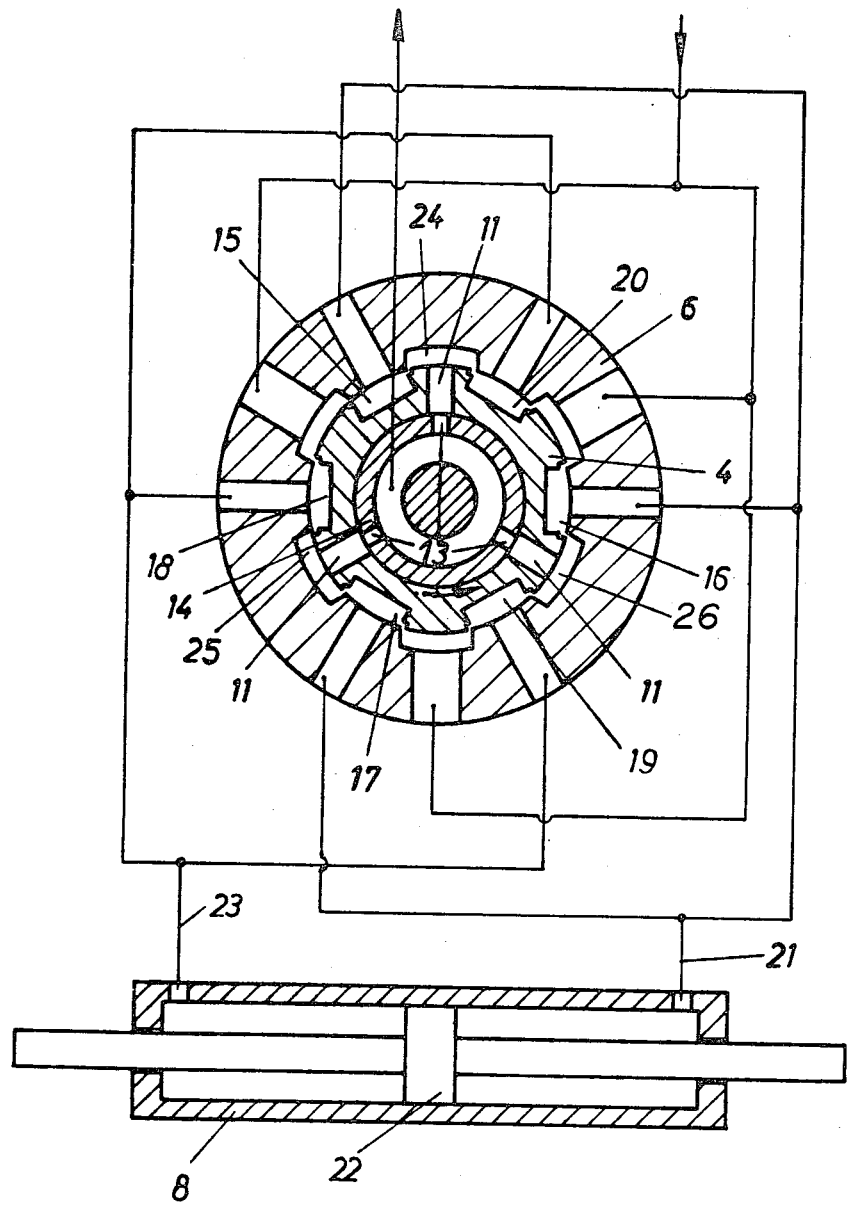
FIG. 2 is a radial section through on line II—II of FIG. 1, the housing being omitted.

For the sake of simplification, the distributor grooves are shown in FIG. 2 in one plane and as ducts. The rotary plug steering valve is of a known construction with the exception of the inner sleeve of the invention, for which reason the overall construction will be mentioned only briefly in what follows.

The rotary valve is carried in a steering gear housing 1 and a steering spindle 2 rotates torque rod 3 to rotate a worm gear 5 (only the upper part being shown). Steering spindle 2 is understood to be connected with a steering wheel (not shown). A rotary valve plug 4 has relative rotary movement within encompassing valve sleeve 6, corresponding to the rotation of a steering wheel. This relative movement, as usual, serves for the control of hydraulic fluid. Inner sleeve 14 serves for the alignment of the rotary valve plug 4 and worm gear 5 and as a bearing for plug 4, being secured in worm gear 5.

Hydraulic fluid from a pump (not shown) is fed, generally oil, by way of a feed connection 7, while the return flow after corresponding operation of a servomotor 8 is discharged from the steering housing 1, by way of a return connection 9 via the interiors of sleeve 14 and valve plug 4. For this purpose the return oil flows through slots such as 13, which are disposed through the sleeve 14 extended in an axial direction, flow starting from return grooves 24,25, 26 by way of respective connecting bores 11 and 12. In the case of the embodiment, there are these equiangularly spaced slots 13, distributed through the periphery of sleeve 14, each with two registrable bores 11 and 12 of valve plug 4, such bores being axially spaced as shown.

The slots 13 are open at the top edge of sleeve 14 and disposed to permit oil flow therethrough in degree dependent on the rotated position of sleeve 14 with valve plug 4, from full flow to throttled flow.

The rotary steering valve shown functions in a known manner. The position of the valve shown in FIG. 2, represents the neutral position with the hydraulic fluid circulation having little or no pressure from inlet 7 to outlet 9.

If the rotary valve plug 4 is rotated in the direction of the arrow (FIG. 2), grooves 15, 16 and 17 permit pressure inflow to servomotor 8; return flow is via grooves 18, 19 and 20. Thus, servomotor 8 is supplied from grooves 15, 16 and 17 via line 21, with pressure and piston 22 moves to the left, as seen in FIG. 2.

The return oil is via a line 23 to the return grooves 18, 19 and 20 in the valve sleeve 6.

Return oil reaches the pairs of bores, 11, 12 of the rotary valve plug 4 via its return grooves 18, 19 and 20, thence to grooves 24, 25 and 26 of valve sleeve 6 which are radially opposite the respective bore pairs 11 and 12 as seen in FIGS. 1 and 2. The bore pairs are not conventional in coaction with slots 13, and more than two bores may be used, or, in fact any suitable passage means through the wall of rotary valve plug of sufficient area within the area of slots 13.

The desired return dynamic pressure during steering is effected as follows: In the neutral position shown in the drawing the bores 11 and 12 are always fully aligned with a respective slot 13. Hydraulic fluid may thus flow therethrough unthrottled. During steering, the rotary valve plug 4 is in rotated position relative to sleeves 6 and 14. The openings 11, 12 and 13 then only partly overlap. As a result the desired throttling is effected. Naturally, it will be necessary for corresponding minimum cross sections of openings to be maintained during a maximum steering turn so that a predetermined dynamic pressure will not be exceeded.

I claim:

1. A rotary valve for a booster steering system of the kind having a rotary valve plug encompassed by a valve sleeve within a housing and including respective high and low pressure coacting grooves and bores and inlet and return passage means in said housing whereby rotation of said rotary valve plug controls pressure flow to a servomotor and return flow therefrom during a steering operation;

the improvement which comprises:

an inner sleeve (14) within said rotary valve plug (4) communicating interiorly with each other and with a return passage means; means whereby said inner sleeve is stationary when said rotary valve plug is rotated;

said rotary valve plug having return flow passage means (11, 12); said inner sleeve having return flow passage means (13) overlapping the return flow passage means of said rotary valve plug in neutral position thereof to shunt flow through said rotary valve without restriction;

wherein relative rotation between said rotary valve plug and said inner sleeve effects reduction in said overlap therebetween to throttle return flow therethrough.

2. A rotary valve as set forth in claim 1, including a worm gear and a torque rod connection between said worm gear and said rotary valve plug; said inner sleeve being carried by said worm gear to thus effect said means for holding said inner sleeve stationary when said rotary valve plug is rotated, and also effecting alignment of said rotary valve plug with said worm gear, and further effecting a bearing for said rotary valve plug; said inner sleeve having a hollow interior and said rotary valve plug having a hollow interior communicating therewith for return flow to said return passage means.

3. A rotary valve as set forth in claim 2, said passage means in said inner sleeve comprising a plurality of longitudinal slots and said passage means in said rotary valve plug comprising pairs of longitudinally aligned bores spaced within the longitudinal dimension of respective slots.

4. A rotary valve as set forth in claim 1, said passage means in said inner sleeve comprising at least one longitudinal slot and said passage means in said rotary valve plug comprising at least two bores longitudinally spaced so as to be within the open area of said slot.

5. A rotary valve for a booster steering system of the kind having a rotary valve plug encompassed by a valve sleeve within a housing and including respective high and low pressure coacting grooves and bores and inlet and return passage means in said housing whereby rotation of said rotary valve plug controls pressure flow to a servomotor and return flow therefrom during a steering operation; the improvement which comprises:

a member (14) having passage means (13) and said rotary valve plug having passage means (11, 12); wherein the respective passage means are comprised in said return flow means and overlap when said rotary valve plug is in neutral position to permit unrestricted return flow through said return passage means from a servomotor, and means affording relative motion between said member and said rotary valve plug responsive to a steering operation to reduce said overlap for effecting a throttled return flow.

6. A rotary valve as set forth in claim 5, said member having contiguous to the interior of said rotary valve plug and effecting bearing support thereto.

7. A rotary valve for a booster steering system of the kind having a worm gear connected with a torque rod operable by a steering spindle and having a rotary valve plug encompassed by a valve sleeve within a housing and rotative relative said valve sleeve by said torque rod when said worm gear is stationary wherein said valve plug and valve sleeve have respective high and low pressure coacting grooves and bores, including inlet and return passage means in said housing whereby rotation of said rotary valve plug relative to said valve sleeve controls pressure flow to a servomotor and return flow therefrom during a steering operation; the improvement which comprises:
- a member (14) secured to said worm gear having passage means (13); said rotary valve plug (4) having passage means (11, 12) overlapping the passage means of said member when said rotary valve plug is in neutral position to permit unrestricted return flow through said overlapped passage means (11, 12, 13) from a servomotor, whereby relative motion between said member and said rotary valve plug is effected during a steering operation to reduce said overlap for restricting return flow to effect throttling thereof.

8. A rotary valve as set forth in claim 7, said member being contiguous to the interior of said rotary valve plug and effecting bearing support thereto.

* * * * *